US00RE34345E

United States Patent [19]

Vinarub et al.

[11] E Patent Number: Re. 34,345

[45] Reissued Date of Patent: Aug. 17, 1993

[54] FIBER OPTIC IMAGING SYSTEM FOR ON-LINE MONITORING

[75] Inventors: Edmond Vinarub, Cheshire, Conn.; Bernard J. Dolan, Winchester, Mass.; Ralph Grabowski, Andover, Mass.; Phillip Carvey, Bedford, Mass.; Tamas Hetenyi, Concord, Mass.; Randal Chinnock, North Reading, Mass.; Kurt Zwirner, Melrose, Mass.

[73] Assignee: Dolan-Jenner Industries, Inc., Woburn, Mass.

[21] Appl. No.: 585,245

[22] Filed: Sep. 19, 1990

Related U.S. Patent Documents

Reissue of:

[64] Patent No.: 4,772,128
Issued: Sep. 20, 1988
Appl. No.: 860,530
Filed: May 7, 1986

U.S. Applications:

[63] Continuation-in-part of Ser. No. 843,761, Mar. 25, 1986, abandoned, and Ser. No. 708,105, Mar. 5, 1985, abandoned, which is a continuation of Ser. No. 625,180, Jun. 27, 1984, abandoned, which is a continuation of Ser. No. 352,596, Feb. 26, 1982, abandoned.

[51] Int. Cl.[5] ..... G01B 11/02

[52] U.S. Cl. ..... 356/384; 250/227.2; 250/560; 359/509

[58] Field of Search ..... 356/241, 372, 375, 379-387; 350/96.25, 96.26, 584; 250/227.2, 560, 561, 562, 578.1; 359/509; 385/116

[56] References Cited

U.S. PATENT DOCUMENTS

| | | | |
|---|---|---|---|
| 2,959,090 | 11/1960 | Davies | 350/584 |
| 3,142,235 | 7/1964 | Siegmund | 350/96.25 |
| 3,740,115 | 6/1973 | Cole | 350/96.26 |
| 4,403,860 | 9/1983 | Pryor | 356/375 |
| 4,441,817 | 4/1984 | Pryor | 356/384 |
| 4,576,482 | 3/1986 | Pryor | 356/384 |

FOREIGN PATENT DOCUMENTS

| | | | |
|---|---|---|---|
| 0039972 | 4/1957 | Poland | 350/584 |

*Primary Examiner*—F. L. Evans
*Attorney, Agent, or Firm*—Hamilton, Brook, Smith & Reynolds

[57] ABSTRACT

A target is viewed by means of a coherent fiber optic bundle comprising a two dimensional array of fibers. A one dimensional linear light detector array, fixed relative to the coherent fiber optic bundle, receives an image of the target and detects light through only a slice of the image to provide dimensional information with respect to the edges of the target. A polyfurcated bundle may view different linear dimensions of the target and allow for the use of the single linear array to detect the multiple dimensions. Electronics provide for detection of target edges by means of a curve fitting technique, computation of dimensions and control of light source intensity and exposure time. Illumination is by a noncoherent light source and a collimator positioned behind the target or by a fiber optic bundle and a light guide plate positioned to illuminate the target from the front. An air purge of the distal optics is provided from a frustoconical annulus formed between two members and from pressurized gas introduced between the annulus and the optics.

47 Claims, 6 Drawing Sheets

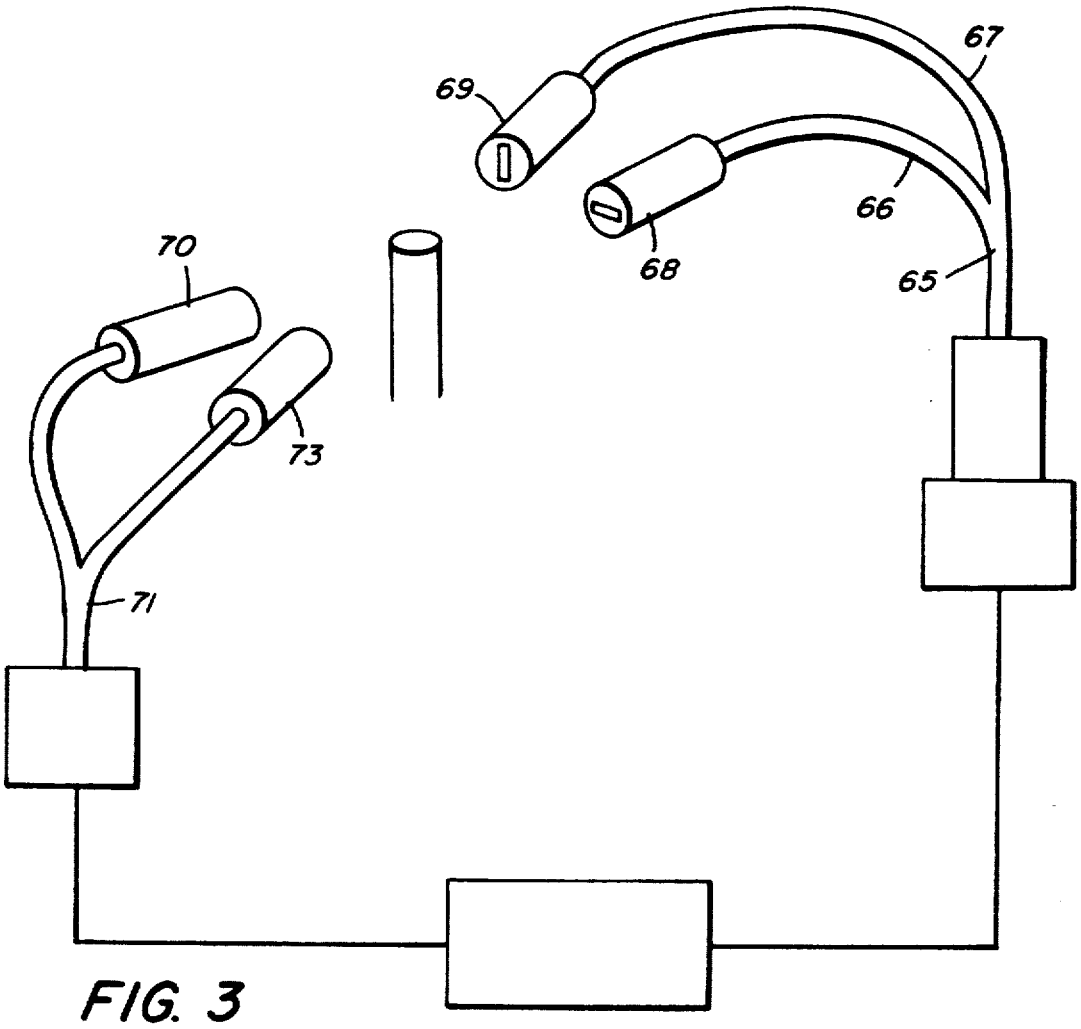
FIG. 3
FIG. 4A
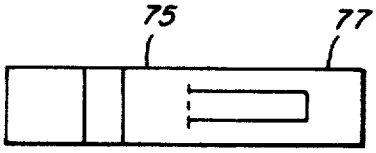
FIG. 4B
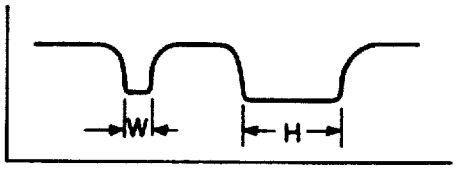

FIBER OPTIC IMAGING SYSTEM FOR ON-LINE MONITORING

Matter enclosed in heavy brackets [ ] appears in the original patent but forms no part of this reissue specification; matter printed in italics indicates the additions made by reissue.

This is a continuation in part of U.S. application Ser. No. 843,761, filed Mar. 25, 1986, now abandoned, and a continuation-in-part of U.S. application Ser. No. 708,105, filed Mar. 5, 1985, now abandoned, which was a continuation of U.S. application Ser. No. 625,180, filed Jun. 27, 1984, now abandoned, which was a continuation of U.S. patent application Ser. No. 352,596, filed Feb. 26, 1982, now abandoned.

BACKGROUND

Machine vision is as an important development requirement to advance the state-of-the-art of industrial robots. In addition, machine vision will have a profound effect on the concepts and methodology of the approaches now taken for on-line quality control monitoring or automated inspection.

Until recently, machine vision systems have consisted primarily of an optical receiver or camera, a transmitter or lighting system, "hard optics" to couple the target image to the receiver, and a computer video image analyzer to digitize and process the picture element, or pixel, information received from the camera interface. However, based upon the development of image transmission via fiber optics, the concept of the fixed based machine vision system may now be expanded to include the capabilities of fiber optics.

The propagation of light in optical fibers is based upon geometric and waveguide theories that have been developed over the past decade to well established principles. When a large number of regularly packed fibers are optically isolated from each other, each fiber can convey an element of an image that is formed on one end of the bundle to the other end of the bundle. A basic requirement of this image transfer is that each fiber end of the bundle have some well defined geometric relationship to its opposite end, that is, spatial coherence, in order for the image to be transferred intact via the optical fibers. This technique is called imaging via spatially coherent fiber optics.

The number of applications for quality control monitoring using fiber optic imaging is so diverse and encompassing that the following list is presented only to indicate the possibilities available using this mode of inspection:

1. Dimensional inspection of small parts, i.e., bolts, screws, wire diameter, etc.
2. Parts placement inspection, i.e., missing parts, displaced parts, incorrect parts, etc.
3. Dimensional gaging of large parts—automotive, machine tool, large equipment, etc.
4. Height measurement requirements—food industry for fill levels of cans, cereal, etc. and pharmaceutical industry for pill level in bottles, etc.
5. Gaging dimensional limits—textiles, web and thread dimensions; pharmaceuticals—bottle cap seal detection; machine tool—die protection.
6. Grading and sorting based upon dimension and placement of parts.

DISCLOSURE OF THE INVENTION

In accordance with one aspect of the present invention, a target is viewed by means of a coherent fiber optic bundle comprising a two dimensional array of fibers secured at a distal end. A one dimensional linear light detector, fixed relative to a proximal face of the fiber optic bundle, receives an image of the target from the bundle and detects light through only a slice of the image. The linear array, which may be a charge coupled device (CCD) array, simplifies the system and provides for high speed data processing to obtain the most commonly needed linear dimension information. On the other hand, the use of a two dimensional bundle, rather than a matching one dimensional array of fibers, to image the target onto the array allows for ease in alignment of the fibers with the detector array and prevents loss of any pixel signal with small misalignment of the bundle and array.

An electronic processor locates the edges of a target within the field of view by identifying the detectors of the array across which there is a transition in the intensity of the detected light. The intensity as a function of positions of the detectors fits a curve and the edges are identified as a location on the curve between the detectors. The electronic processor may provide a computation of the width of the target based on the spacing of the detected edges.

The system may include a polyfurcated optic bundle for imaging plural target images onto the single detector array. The system may include electronics for windowing the signals from the light detector array to separate the images received from respective bundle segments of the polyfurcated bundle. Thus, plural bundle segments may be used to direct multidimensional information into a simple linear detection array.

The electronics may control both the intensity of a light source which illuminates the target and the duration of exposure of the light detector array. In a first mode, the electronics minimizes the intensity of the light source to prolong the life of the light source, and in a second mode the electronics may minimize the duration of exposure to permit viewing of rapidly moving targets.

Where the target is illuminated from its side opposite to the detecting fiber optic bundle, the illuminator preferably includes a noncoherent light source and a collimator for collimating the light from the light source. The collimator may comprise a single lens with an aperture for limiting the light passing throught the lens to that near the optic access of the lens. The lens receives light from a small aperture at the end of an illuminating fiber optic bundle which serves as a point source.

Air purges may be provided at the viewing end of the coherent bundle and at the end of an illuminating bundle to prevent contamination of the optics with dust and debris. The air purge includes an inner member having a generally frustoconical end and a viewing bore therethrough. An outer member has a viewing bore therethrough and an internal, generally frustoconical surface complementary to and fitted over the frustoconical end of the inner member in spaced relation thereto. The two members thus define an annulus which is terminated at a viewing bore defined by the bores of the inner and outer members. Pressurized fluid is directed into the annulus and out through the viewing bore of the outer member. The inner member may further include a passage for directing pressurized fluid into the bore between the annulus and the optical system to prevent the creation of a vacuum in that region. The inner and outer members may be positioned within a sleeve which defines a plenum about the two members. A second sleeve, rotatable relative to the first sleeve, may provide for mounting of the purge assembly to the optical system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates an alternative embodiment of the present invention in which the illuminating and receiving optics include bifurcated fiber optic bundles;

FIGS. 4A and B illustrate the image formed on a face of the fiber optic bundle of FIG. 3 and the resultant signal generated by the detector array;

DESCRIPTION OF PREFERRED EMBODIMENTS

Figure 1:
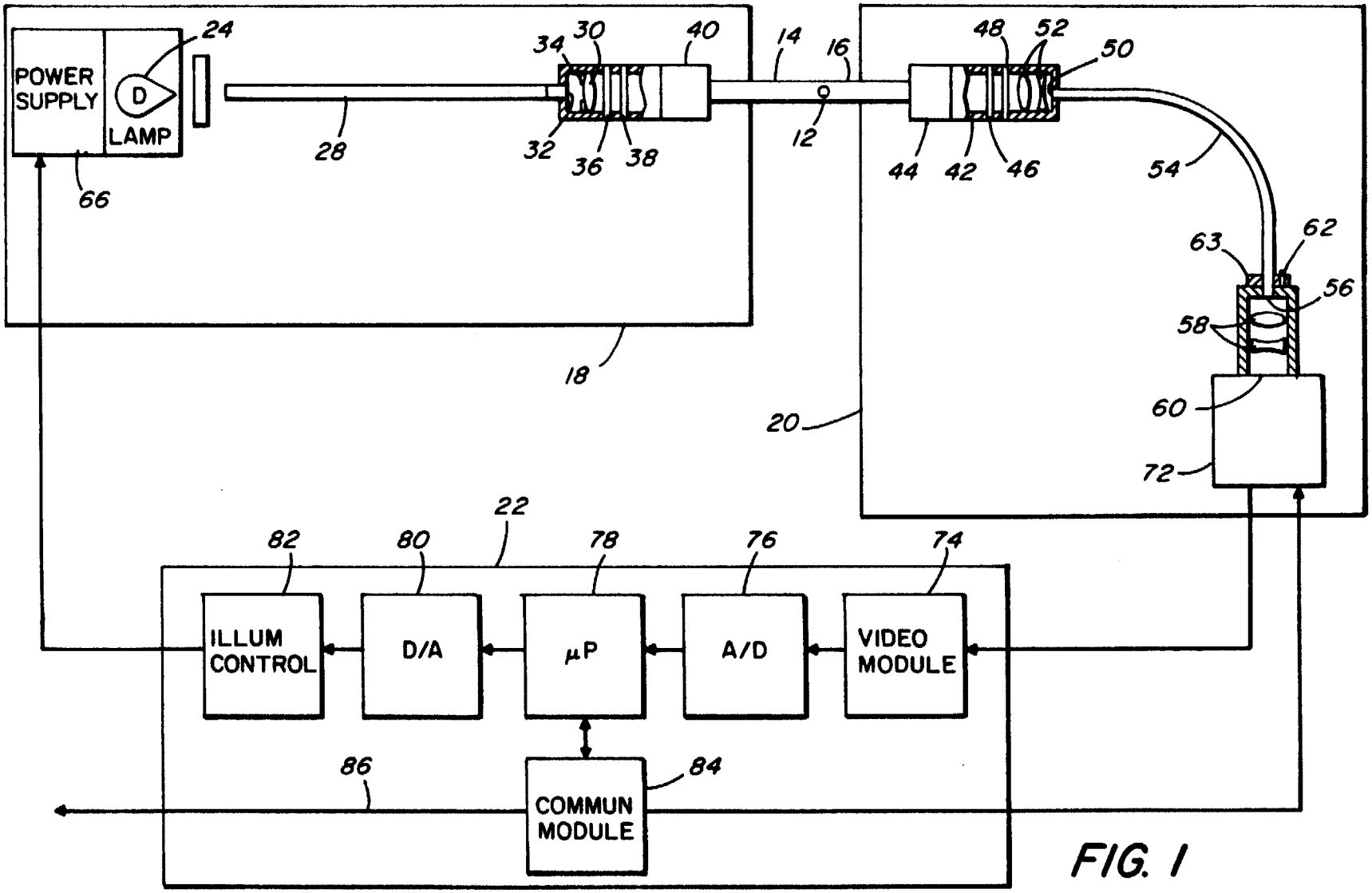
FIG. 1 illustrates a system embodying the present invention.

FIG. 1 is a schematic illustration of a fiber optic imaging system embodying the present invention. The system shown is designed to monitor the width of a pin 12 which may, for example, be part of an assembly on a moving conveyor belt. The pin is illuminated by a light beam 14 and its width is determined from the resultant shadow 16. It will be recognized that the system could be used for other shapes and applications. For example, the light could pass through a slit in monitoring the slit width or position. As will be described below, the system can also be used in a reflective mode in which the target is illuminated from the same side as the image collecting optics. The latter system, for example, may be used to monitor traces on PC boards or gaps in assembled parts.

The system includes an illumination system 18 and an imaging system 20 both of which are controlled by an electronic processing system 22. The processing system also processes the images generated in the imaging system to provide such outputs as width, position and relative position.

Illumination is provided by a noncoherent lamp 24 and the intensity of the light source is determined by the control signal to the power supply 26. The light from the lamp is passed through a homogenizer 26 to a fiber optic bundle 28. From the bundle 28, the light is directed through a collimated lens 30. Very low divergence in the illuminating beam can be obtained by a single biconvex lens 30 illuminated through a small aperture at the distal face 32 of the fiber optic bundle. That aperture serves as an approximation to a point source to the collimating lens 30 and is positioned at about the focal length of the lens 30. Further, the light passing through the lens is limited to the central portion of the lens by a second aperture 34. The use of collimated light allows for simple optics in the collecting portion of the system which does not have a great depth of field. With collimated light the pin 12 can be moved along the beam axis without causing significant spreading of its shadow. Using the collimated beam, the object may be positioned anywhere within the range of 2 to 10 inches.

The collimated light may be passed through an appropriate filter 36 and a polarizer 38. An air purge collar 40 may be positioned on the end of the illuminating optics to prevent contamination of the optics with dust and debris. The air purge is described in detail below.

The portion of the beam 14 which is not blocked by the target 12 enters a light collector housing 42 through an air purge collar 44. The collecting optics may include a polarizer 46 and a filter 48. This polarizer reduces the amount of reflected light which might be detected by the system. Further, where a polarizer is included in the illuminating optics, the two polarizers would match and further enhance the signal to noise ratio. Similarly, matching filters can increase the signal to noise ratio. The received light is imaged onto the face 50 of a fiber optic bundler 54 by lenses 52. The optics 52 provide for scaling to control the target area viewed by the imaging system. The fiber optic bundle is a coherent bundle; that is, the fibers within the bundle have the same relative orientation at the distal end 50 of the bundle as at the proximal end 56 of the bundle. Thus, an image formed on the distal face of the bundle is also formed on the proximal end of the bundle to a resolution determined by the density of the optic fibers.

Figure 2A:
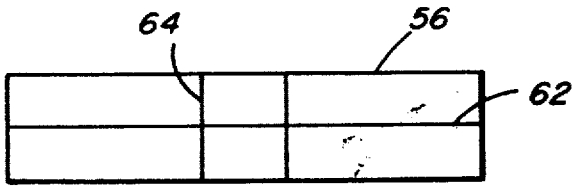
FIGS. 2A and B illustrate the image provided on the face of a fiber optic bundle in the system of FIG. 1 and the resultant signal generated by the detecting array.

The image formed by the coherent bundle at its end face 56 is imaged by optics 58 onto a linear array of charge coupled devices 60. The orientation of the proximal end of the fiber optic bundle relative to the linear array 60 is determined by a key pin 62 in a hole in a flange 63 fixed to the bundle. The face 56 of the coherent bundle, and similarly the face 50 of the bundle, is formed of a two dimensional array of fibers, preferably in a rectangular shape as illustrated in FIG. 2A. The face may, for example, be a matrix of 150 fibers by 30 fibers. The charge coupled device array, however, is a one dimensional array and thus only detects from a slice of the collected image as illustrated at 62 of FIG. 2A. The fixed array provides the desired information with respect to a single dimension, and such information can be rapidly processed.

The use of a two dimensional bundle allows for alignment of the narrow detector array 62 with the relatively wide bundle 56 with a simple key mechanism without much concern for precise positioning. The wider bundle also allows for ease in alignment of the optics at the distal end of the bundle with the target. The bundle 54 can be removed with its flange 63 from the proximal optics and observed while position of the distal optics is adjusted. In the example of detecting the width of a pin, for example, the image of the pin 64 can be observed in the face 56 and the distal optics can be oriented to align the image 64 perpendicular to the major dimension of the bundle face 56.

The one dimensional detector array does not provide the full multi-dimensional information which would otherwise be available with a two dimensional detector array or a scanning one dimensional array. However, typically, the information required is limited to no more than a few dimensions. In accordance with the present invention, those few dimensions can be observed and monitored while maintaining simplicity of the detector electronics by the use of plural simple linear systems or by the use of polyfurcated fiber optic bundles as illustrated in FIG. 3. For example, the bundle 65 may be bifurcated to form first and second segments 66 and 67. The two bundles are joined to form a single end face, as illustrated in FIG. 4A, divided into segments 75 and 77 corresponding to the respective coherent bundle segments. Each segment 66, 67 includes its own distal optics 68, 69. The distal optics 68 and 69 may assume any relative orientation. For example, optics 68 might provide an indication of width and optics 69 might be positioned to provide an indication of height as illustrated in FIGS. 3 and 4. As another example, one might provide a front view and another a side view of the pin 12. Any number of bundle segments might be provided, but typically only a few dimensions are of interest. The illuminating optics may similarly include a bifurcated bundle 71 and separated illuminating optics 70 and 73.

Figure 2B:
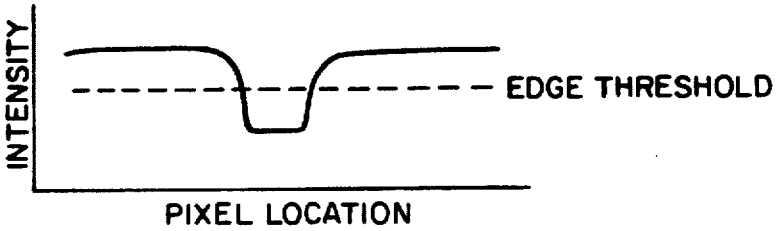
Figure 5A:
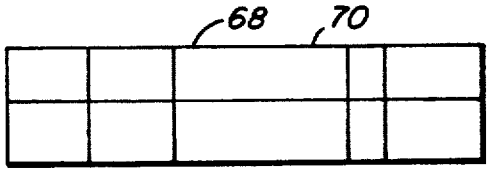
FIGS. 5A and B illustrate the image and the resultant signal where two side-by-side targets are provided in the system of FIG. 1.
Figure 5B:
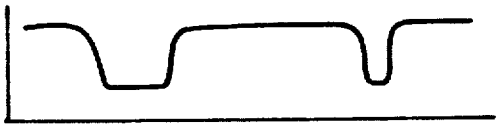

Detector drive electronics and initial analog processing electronics may be included at 72 adjacent to the detector array. The analog signals then pass to the processing electronics 22 which may be remote. A typical analog signal received from a single scan of the CCD array viewing the pin as shown in FIG. 2A is illustrated in FIG. 2B. In this illustration, the target presents a shadow so the background intensity is high and the intensity drops at the image of the pin. FIGS. 5A and 5B illustrate imaging of two side-by-side parts and the resultant CCD output. The intensity drops at both targets. In the case of the bifurcated bundle, the intensity shown in FIG. 4B is seen to similarly drop as the CCD array scans through each image of the pin. In viewing through a slit the background might be low and the slit high in intensity. In a reflective mode, the intensity might, for example, be low and increase at a reflective stripe or be high and drop at a dark stripe.

Analog signals shown in FIGS. 2B, 4B and 5B are further amplified by video module 74 in the processing electronics and converted to digital signals by an analog to digital converter 76. Those digital signals are then further processed by a microprocessor 78. The microprocessor may additionally drive the lamp power supply 26 through a digital to analog converter 80 and control electronics 82. Further, the microprocessor may communicate through a module 84 with the CCD drive electronics 72 to control the exposure time of the CCD array per scan and may communicate with a host processor through line 86. Further details of the electronics processing and control will be described below.

Figure 6:
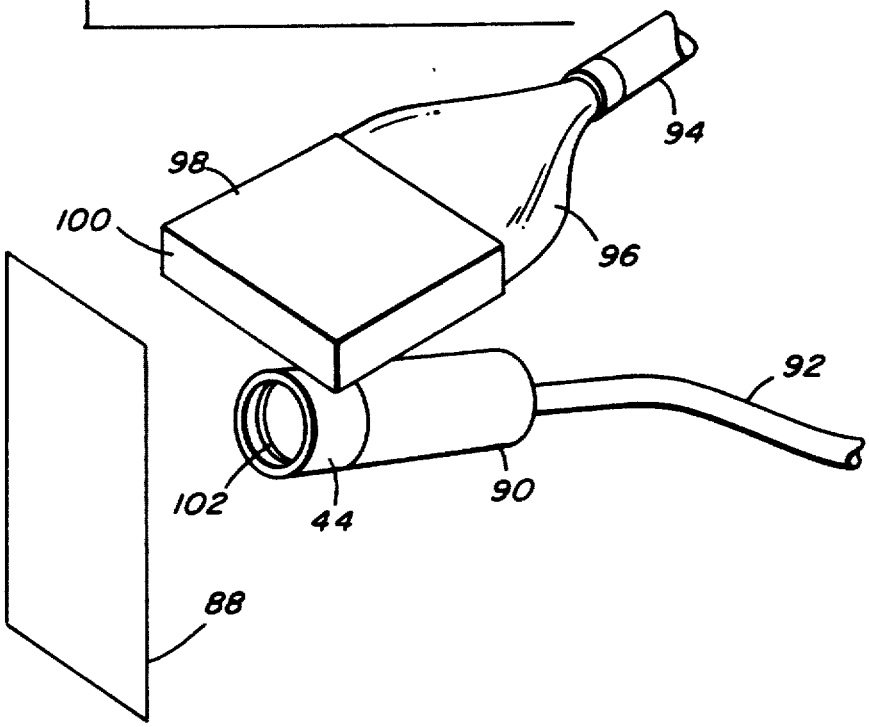
FIG. 6 illustrates the illuminating optics for use in a reflective mode.

A preferred illuminator when the system is operating in a reflective mode is illustrated in FIG. 6. In this case, a flat card 88 is viewed through optics 90 and a coherent bundle 92. Again, it is preferred that the card be illuminated through fiber optics 94. In this case, the noncoherent bundle of circular cross section is spread through a flair 92 into an elongated cross section. Typically, the light delivered by a bundle is nonuniform. In accordance with the present invention, a quartz plate 98 is positioned to receive the light from the fiber optic bundle. That quartz plate acts to mix the light from the individual fibers to provide uniform illumination from its end surface 100. The quartz serves as a light guide and thus there is little loss of light through the faces of the plate other than the end face 100. A plate one inch long, two inches wide and ⅛ inch thick has been found suitable for providing adequate mixing.

Figure 7:
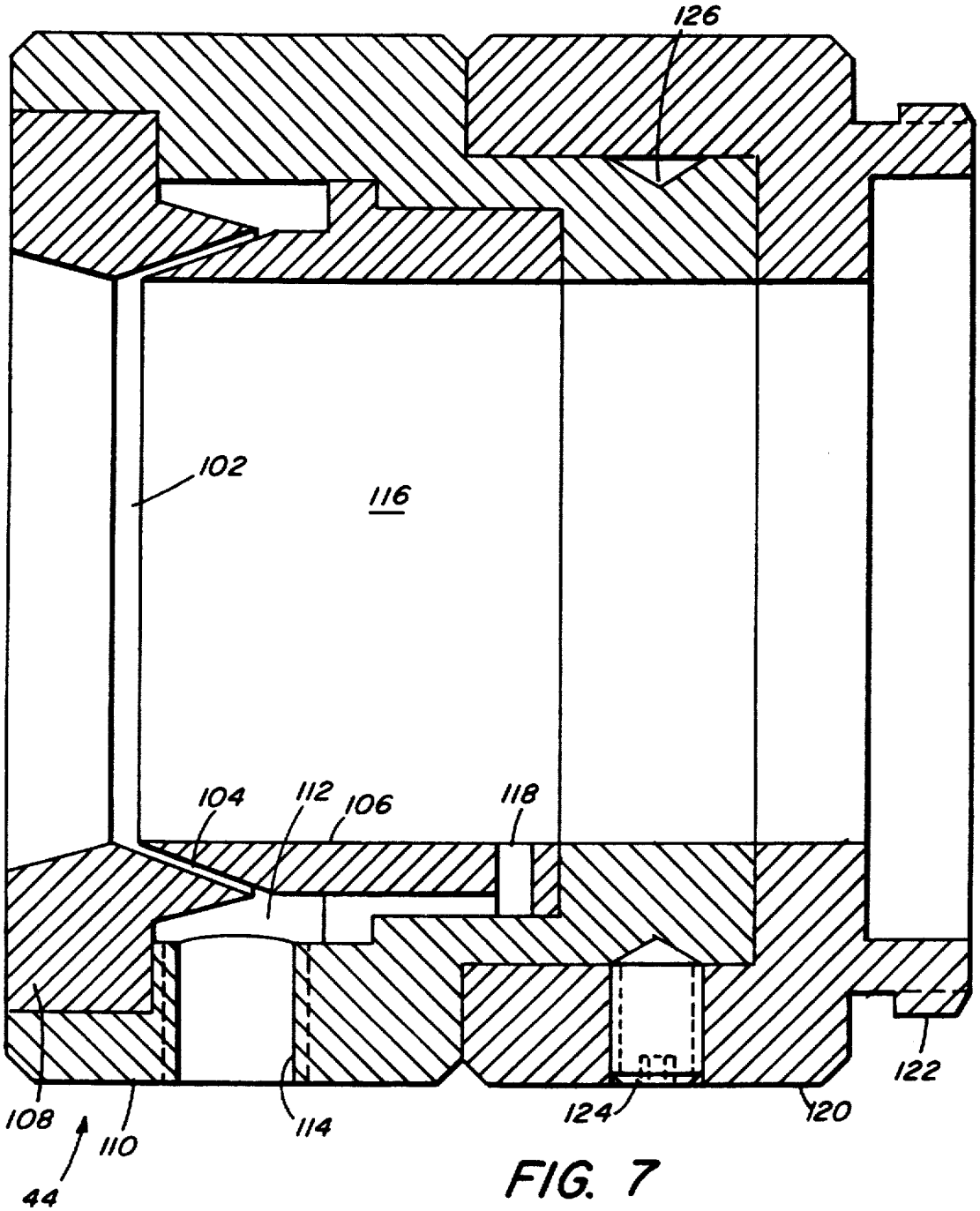
FIG. 7 illustrates an air purge used in the system of FIG. 1.

In FIG. 6, an annular slit 102 is illustrated in the viewing bore of the collection optics 90. Pressurized air is directed from that slit to create a high pressure zone at the inlet to the viewing bore and thus keep dust and debris from entering the viewing bore. Greater details of the air purge unit 44 are illustrated in FIG. 7. The annular slit 102 from which the pressurized gas is discharged is at the end of a frustoconical annulus 104 formed between the complimentary, tapered ends of an inner member 106 and an outer member 108. The inner and outer members are surrounded by a sleeve 110 which forms a plenum 112 about both members. High pressure gas is admitted to the plenum 112 through a threaded port 114. The generally frustoconical annulus 104, which may actually be of more complex shape, directs the discharged gas out through the bore of the outer member 108 with nonturbulent flow which minimizes the creation of any vortices which might pull dust back into the viewing bore 116.

The gas flowing from the discharge port 102 does create a venturi effect which lowers the pressure in the bore 116. To prevent a vacuum which might draw dust into the viewing bore, a passage 118 is provided between the plenum 112 and the region of the viewing bore between the discharge port 102 and the optics to which the purge collar would be fixed.

The final element of the purge collar is a second sleeve 120 which surrounds the sleeve 110. The sleeve 120 includes a threaded coupling 122 adapting the sleeve to be readily coupled to the housing of the illuminating or imaging optics. With the set screw 124 loosened, the two sleeves are rotatable relative to each other so that the gas charging port 114 can be conveniently positioned in any direction relative to the optics to which the collar is coupled. The set screw is then tightened into a groove 126.

Figure 8:
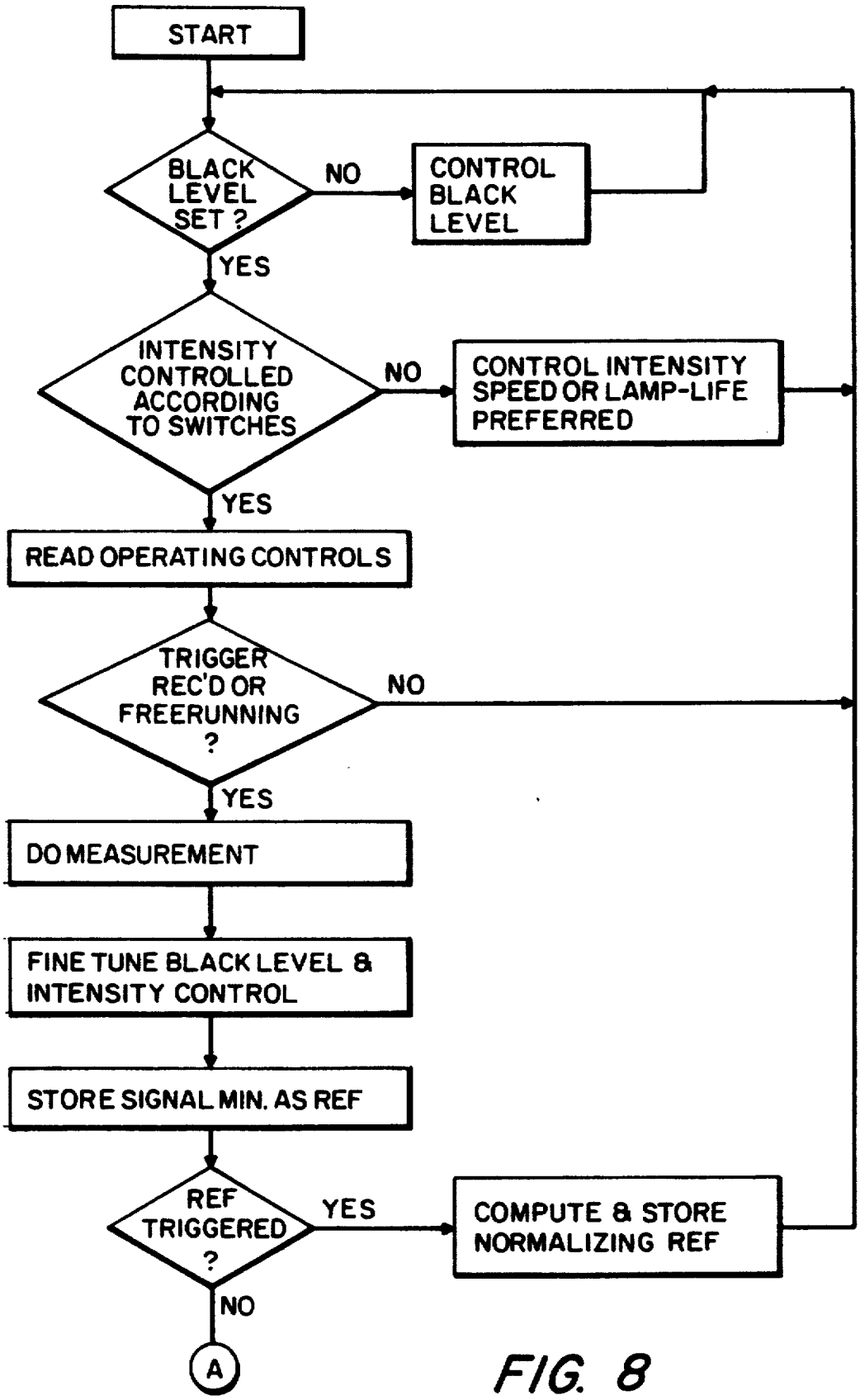
FIG. 8 is a flow chart of the electronic processing and control of FIG. 1.
Figure 8:
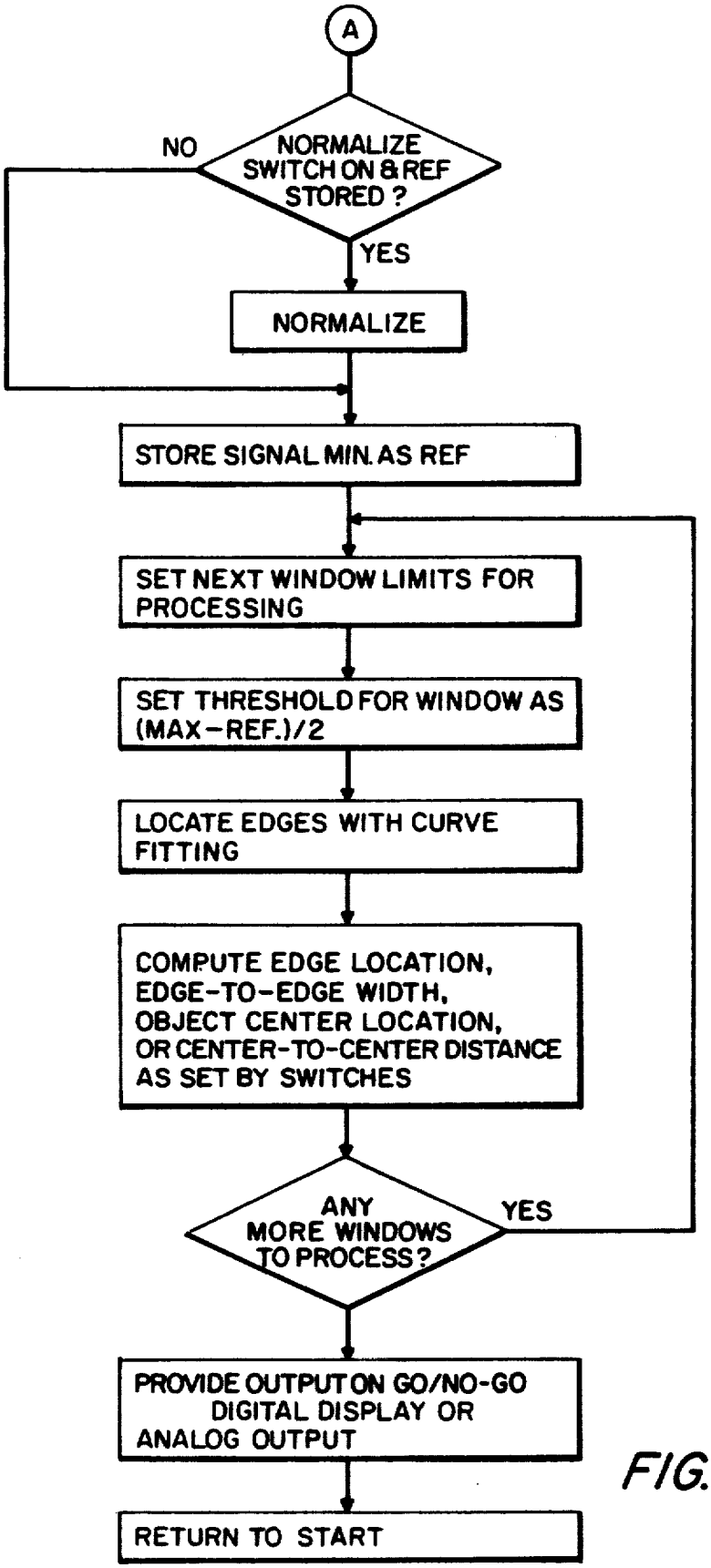

The data processing and control of the system will now be described with reference to the software flow chart of FIG. 8. When the system is on, the processor continues to cycle through the routine. Initially, the black level of the analog signal received from the charge coupled device must be set such that signals received from the array are within the range of the analog to digital converter. The black level of a CCD array can vary slowly over a voltage range of 5 to 15 volts.

With the black level set, the scan rate of the CCD drive electronics, which determines the exposure time, and the intensity of the illuminating lamp must be set. The system allows for two modes of intensity control. In a lamp-life mode, the intensity of the lamp is held to a minimum and the exposure time is controlled to set the intensity level of the incoming signal within a predetermined range. In a speed preferred mode, the exposure time may be set at a minimum and the intensity of the lamp may be increased to provide the desired detected signal. Alternatively, the lamp may be provided with only high and low intensity levels for the two modes of operation, and the exposure time can be controlled in each mode. The lower intensity of the lamp lends to longer lamp life. The higher exposure speed, on the other hand, allows for imaging of rapidly moving targets.

Operating controls to the system include switches for establishing various modes of operation and potentiometers to establish various parameters such as window limits and go/no-go limits. These controls are read at this point of the system loop.

The system may be set in either a free running or a triggered mode of operation. In the free running mode of operation, the system continues to cycle through the full routine to check for any target edges in the field of view as indicated by a significant change in intensity level in the received signal. In the triggered mode of operation, a system controller can provide a trigger signal to the microprocessor 78 through line 86, and it is only at that time that a measurement will be made. Thus, a measurement is made either when the system is in the free running mode or when a trigger is received in the trigger mode.

As a signal such as that shown in FIG. 2B is received, fine tuning of the black level and intensity controls is obtained. Then, the signal is processed. The minimum of the processed signal is stored as a reference period. Then, the system determines whether the received trigger is a reference trigger or a measurement trigger. The reference trigger may be provided to the system to allow for storing of a normalizing reference when a target is not in the field of view in order to allow for correction of nonuniformities in the collection optics and the CCD output with future target measurements. If the received trigger is a reference trigger, a normalizing reference is computed and stored for each pixel of the array and the system is returned to the start of the routine.

If the trigger is not a reference trigger, the system continues to process the pixel data received from the CCD array. If the normalizing reference is stored and a system switch indicates that the data should be normalized, it is. Thereafter, the minimum pixel level is stored as a reference.

Window limits may next by set by the system for deleting unwanted portions of the detected image from processing. Those unwanted portions may include images adjacent to the target which are not to be processed at all or images from separate polyfurcated bundle segments which must be processed separately.

A threshold used in detecting an edge is set at half of the difference between the maximum signal in the window and the minimum reference. Due to diffraction of the light and other nonideal characteristics of the system, an instantaneous change in intensity at the edge of a target is not obtainable. Rather, the intensity changes over several pixels as illustrated in FIG. 2B. The present system accepts as the edge position the position at a threshold intensity midway between the maximum and the minimum intensities.

To minimize the cost of the system and to increase its speed, a relatively short CCD array of 128 pixels is used. That array only provides for seven bit resolution of the edge location if one assumes the edge to be at the pixel nearest to the edge threshold. However, the present system computes an edge location based on a curve fitting technique which provides an 11 bit output. The 11 bit output provides for a resolution equivalent to that which would have been obtained by a 2048 pixel array without resolution enhancement. In the present system, the four pixels nearest to the edge threshold are used to define a quadratic curve which best fits the intensity levels of those pixels. The point at which that quadratic curve crosses the edge threshold level is then taken as the exact position of the edge. Although curve fitting to a quadratic equation is preferred, other algorithms might be used. For example, a simpler but less precise algorithm would be to assume a linear curve between the two pixels nearest to the edge threshold level. In addition, more complex functions or polynomials may be used to fit edges with more irregular shapes.

Once edges are detected, the present system allows for several basic computations for bright targets and dark targets. The system may compute the distance between two edges to provide a measurement of the width of the target. It may determine the location of an edge or the location of the center point between two edges. Where two targets are viewed by the array as illustrated in FIG. 5B, the system may provide for a center to center distance measurement. Where two independent images are provided as shown in FIG. 4A, independent width and distance measurements may be made within each window of the overall image as specified by the electronics.

After computations are made for each window, the system determines whether additional windows must be processed. If so, the processing loop is repeated.

The system provides for several basic outputs. An analog output indicating the detected signal such as illustrated in FIG. 2B may be provided. A digital display of the desired computational output may be provided. Further, a go/no-go output using three LEDs may be provided. The three LEDs may correspond to output signals to control a system. For example, they may indicate whether the computed measurement is within a predetermined range, above that range or below that range. With those three outputs, the system can be used for quality control to trigger response from the overall system when a part fails. The local processor may also be programmed to transmit specific data to a main processor.

Figure 9:
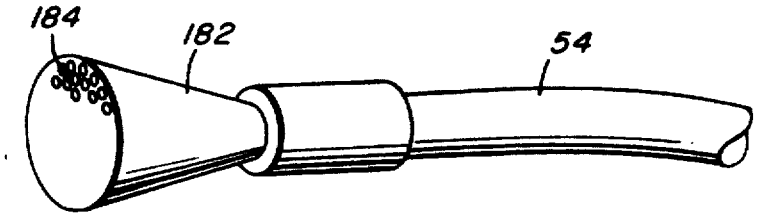
FIG. 9 illustrates a fiber optic taper at the distal end of the bundle.

FIG. 9 illustrates an alternative arrangement at the distal end of the coherent fiber optic bundle 54. A fiber optic taper 182 serves as a lens by contracting an image which impinges the end face 184 to a smaller image at the interface with the coherent fiber optic bundle 54. The taper 182 is a rigid structure of visually coherent fiber optic filaments compressed at the end adjacent to the fiber optic bundle.

While this invention has been particularly shown and described with references to preferred embodiments thereof, it will be understood by those skilled in the art that various changes in form and details may be made therein without departing from the spirit and scope of the invention as defined by the appended claims.

We claim:

1. A dimension monitoring system comprising:

a coherent fiber optic bundle comprising a two dimensional array of fibers secured at a distal end for viewing a target across two dimensions;

a one dimensional linear light detector array fixed relative to a proximal face of the fiber optic bundle for receiving an image of the target from the bundle to detect light through only a slice of the image; and electronic processing means for locating the edge of a target by identifying the detectors of the array across which there is a transition in the intensity of the detected light, fitting the positions of the detectors to a curve and identifying the edge location as a location on the curve between the detectors.

2. A monitoring system as claimed in claim 1 wherein the light detector array is a charged coupled device array.

3. A [measurement] *monitoring* system as claimed in claim 1 wherein the electronic means includes means for detecting two edges of the target and means for computing the width of the target based on the spacing of the detected edges.

4. A [measurement] *monitoring* system as claimed in claim 1 wherein the coherent fiber optic bundle is a polyfurcated optic bundle and the light detector array is positioned to receive images from a common end of plural bundle segments.

5. A monitoring system as claimed in claim 4 further comprising electronic means for windowing signals from the light detector array to separately process the images viewed from respective bundle segments.

6. A [measurement] *monitoring* system as claimed in claim 1 further comprising a noncoherent light source and a collimator for collimating the light from the light source for illuminating the target from the side opposite to the fiber optic bundle.

7. A [measurement] *monitoring* system as claimed in claim 6 further comprising a fiber optic bundle between the light source and the collimator, and wherein the collimator comprises a single lens and an aperture for limiting the light passing through the lens to that near the optic axis of the lens.

8. A [measurement] *monitoring* system as claimed in claim 1 further comprising a light source and electronic means for controlling the intensity of the light source and the duration of exposure of the light detector array, the electronics means operating in a first mode to minimize the intensity of the light source and in a second mode to minimize the duration of exposure.

9. A [measurement] *monitoring* system as claimed in claim 1 further comprising an air purge for maintaining a high pressure zone in a viewing bore in front of the distal end of the fiber optic bundle, the air purge comprising:

an inner member having a generally frustoconical end and a viewing bore therethrough;

an outer member having a viewing bore therethrough and an internal, generally frustoconical surface complementary to and fitted over the frustoconical end of the inner member in spaced relation thereto to define a frustoconical annulus terminating at a viewing bore defined by the bores of the inner and outer members; and means for directing pressurized fluid into the annulus and out through the viewing bore of the outer member.

10. A [measurement] *monitoring* system as claimed in claim 9 further comprising a lens positioned to receive light from the bore of the inner member, the inner member further comprising means for directing pressurized fluid into the bore of the inner member between the annulus and the lens.

11. A [measurement] *monitoring* system as claimed in claim 1 further comprising a fiber optic taper at the distal end of the fiber optic bundle for viewing the target.

12. A [measurement] *monitoring* system as claimed in claim 1 wherein *the electronic processing means provides a* digital signal indicative of one of a range of detected radiation amplitudes [is provided from] *for* each element of the detector array.

13. A linear dimension monitoring system comprising:

a noncoherent light source including a fiber optic bundle;

a collimator for collimating light from the light source and illuminating a target from a first side, the collimator comprising a single lens and an aperture for limiting the light passing through the lens to that near the optic axis of the lens;

a coherent fiber optic bundle secured at a distal end for viewing the target from a side opposite to the first side; and a light detector array for detecting light from the fiber optic bundle.

14. An air purge for a viewing system comprising:

an inner member having a generally frustoconical end and a viewing bore therethrough;

an outer member having a viewing bore therethrough and an internal, generally frustoconical surface complementary to and fitted over the frustoconical end of the inner member in spaced relation thereto to define a frustoconical annulus terminating at a viewing bore defined by the bores of the inner and outer members;

a first sleeve surrounding and retaining the inner member and outer member, and defining a plenum within the first sleeve in communication with the frustoconical annulus and with the bore of the inner member behind the annulus, and having a port therethrough to the plenum; and a second sleeve rotatable relative to the first sleeve and adapted for mounting to an optical system at an end of the air purge opposite to the outer member.

15. A method of measuring a linear dimension comprising:

viewing a target across two dimensions from each of two directions by means of a bifurcated coherent fiber optic bundle comprising a two dimensional array of fibers; and simultaneously detecting respective images of the target from the fiber optic bundle through only a slice of the images with a linear light detector array.

16. A method a claimed in claim 15 further comprising the step of electronically windowing signals from the light detector array to separately process the images viewed from respective bundle segments of the bundle.

17. A method as claimed in claim 15 further comprising illuminating the target from a side opposite to the fiber optic bundle by means of a noncoherent light source through a collimator.

18. A method of monitoring multiple linear dimensions of a target comprising:

providing a linear light detector array;

providing [plural coherent fiber optic bundles] *a polyfurcated fiber optic bundle having plural coherent segments* and orienting a distal end of each *segment of the polyfurcated* bundle to view the target along one of the multiple linear dimensions;

simultaneously detecting images of the target from the plural [coherent fiber optic bundles] *segments of the polyfurcated bundle* by means of the light detector array; and electronically processing signals from the detector array to provide indictations of the multiple linear dimensions.

[19. A method as claimed in claim 18 wherein the coherent fiber optic bundles are segments of a polyfurcated bundle.]

20. A method as claimed in claim [19] *18* wherein the polyfurcated bundle comprises a two dimensional array of fibers and the light detector array is a one dimensional array which views only a slice of the end face of the polyfurcated [coherent] bundle.

21. A dimensional monitoring system comprising:

a plurality of coherent fiber optic bundles *wherein the coherent fiber optic bundles are segments of a polyfurcated bundle*, each bundle being oriented at a distal end thereto to provide a respective target image;

a linear light detector array for simultaneously receiving the images from the fiber optic bundles;

processing electronics for establishing windows in signals received from the detector array corresponding to the respective images provided by the fiber optic bundles and providing dimensional information corresponding to the respective images.

[22. A dimension monitoring system as claimed in claim 21 wherein the coherent fiber optic bundles are segments of a polyfurcated bundle.]

23. A method of monitoring the characteristics of articles transferred along a path in an industrial process comprising viewing the articles through a coherent fiber optic taper and a coherent fiber optic bundle such that the taper contracts images of the articles to smaller images transmitted through the bundle, and detecting light from the fiber optic bundle to provide an electrical output related to visual features of individual articles.

24. A method as claimed in claim 23 wherein the light is detected by a plurality of detector elements and further comprising providing a digital signal from [each detector] *electronic processing means* indicative of one of a range of detected radiation amplitudes *for each detector element.*

*25. An optical monitoring system, comprising:*

*a) a coherent fiber optic bundle for viewing an object;*

*b) a coherent fiber optic taper positioned relative to the coherent fiber optic bundle for changing image size of an image of the object; and*

*c) a light detector array for receiving and detecting the size changed image from the bundle and taper; and*

*d) processing electronics connected to the light detector array for converting the detected size changed image to a digital signal representation indicative of one of a range of detected radiation amplitudes for each element of the detector array.*

*26. An optical monitoring system as recited in claim 25 further comprising a recorder for recording the digital signal representation of the image.*

*27. An optical monitoring system as recited in claim 25 further comprising a non-coherent light source and a collimator for collimating light from the light source.*

*28. An optical monitoring system as recited in claim 27 wherein the collimator comprises a single lens and an aperture for limiting the light passing through the lens to that near the optic axis of the lens.*

*29. An optical monitoring system as recited in claim 27 further comprising a fiber optic bundle positioned between the light source and the collimator.*

*30. An optical monitoring system as recited in claim 25 further comprising a light source and an electronic means for controlling the intensity of the light source and the duration of exposure of the light detector array, the electronics means operating in a first mode to minimize the intensity of the light source and in a second mode to minimize the duration of exposure.*

*31. An optical monitoring system as recited in claim 25 wherein the light detector array is a linear array.*

*32. An optical monitoring system as recited in claim 25 wherein the light detector array is a charge coupled device array.*

*33. An optical monitoring system as recited in claim 25 further comprising a processor for processing the digital signal representations of the image to determine a location of an edge of the object.*

*34. An optical monitoring system as recited in claim 33 wherein the processor employs a quadratic curve fitting approach to determine the location of the edge.*

*35. An optical monitoring system as recited in claim 25 wherein the coherent fiber optic bundle is a polyfurcated fiber optic bundle.*

*36. An optical monitoring system as recited in claim 35 further comprising electronic means for windowing of the image to separately process the images received from segments of the polyfurcated bundle.*

*37. A method of optically monitoring an object, comprising:*

*a) receiving, from a coherent fiber optic bundle, light signals of an optical image of the object at detector elements of a light detector array;*

*b) digitizing, in a processor coupled to the detector array, electrical signals representative of the intensities of the received light signals for each said detector element;*

*c) encoding the digitized signals into digital values corresponding to one of a range of detected radiation amplitudes for each element of the detector array;*

*d) recording said digital values; and*

*e) processing said digital values to determine visual features of the object.*

*38. A method as recited in claim 37 wherein location of an edge of the object is one of the visual features of an object that is determined in the processing step.*

*39. A method as recited in claim 38 wherein the location of the edge of the object is determined by employing a curve fitting approach.*

*40. A method as recited in claim 39 wherein the location of the edge of the object is determined by employing a quadratic curve fitting approach.*

*41. A method as recited in claim 37 further comprising the step of illuminating the object with a non-coherent light source.*

*42. A method as recited in claim 41 further comprising the step of collimating the illuminating light from the non-coherent light source.*

*43. A method as recited in claim 42 wherein the collimating step uses a lens to collimate the light and also uses an aperture for limiting the light passing through the lens to that near the optic axis of the lens.*

*44. A method as recited in claim 43 wherein an optical fiber is used to carry the light from the non-coherent light source to the collimating lens.*

*45. A method as recited in claim 37 wherein the coherent fiber optic bundle is a polyfurcated bundle.*

*46. A method as recited in claim 37 wherein the processing step comprises windowing the image to separately process images received from segments of the coherent fiber optic bundle.*

*47. A method as recited in claim 37 further comprising the step of controlling the intensity of a light source and the duration of exposure of the light detector array with an electronic means so as to operate in a first mode to minimize the intensity of the light source and to operate in a second mode to minimize duration of exposure.*

* * * * *